March 6, 1928. 1,662,025
J. E. BRENNAN ET AL
FIREARM
Original Filed April 23, 1924
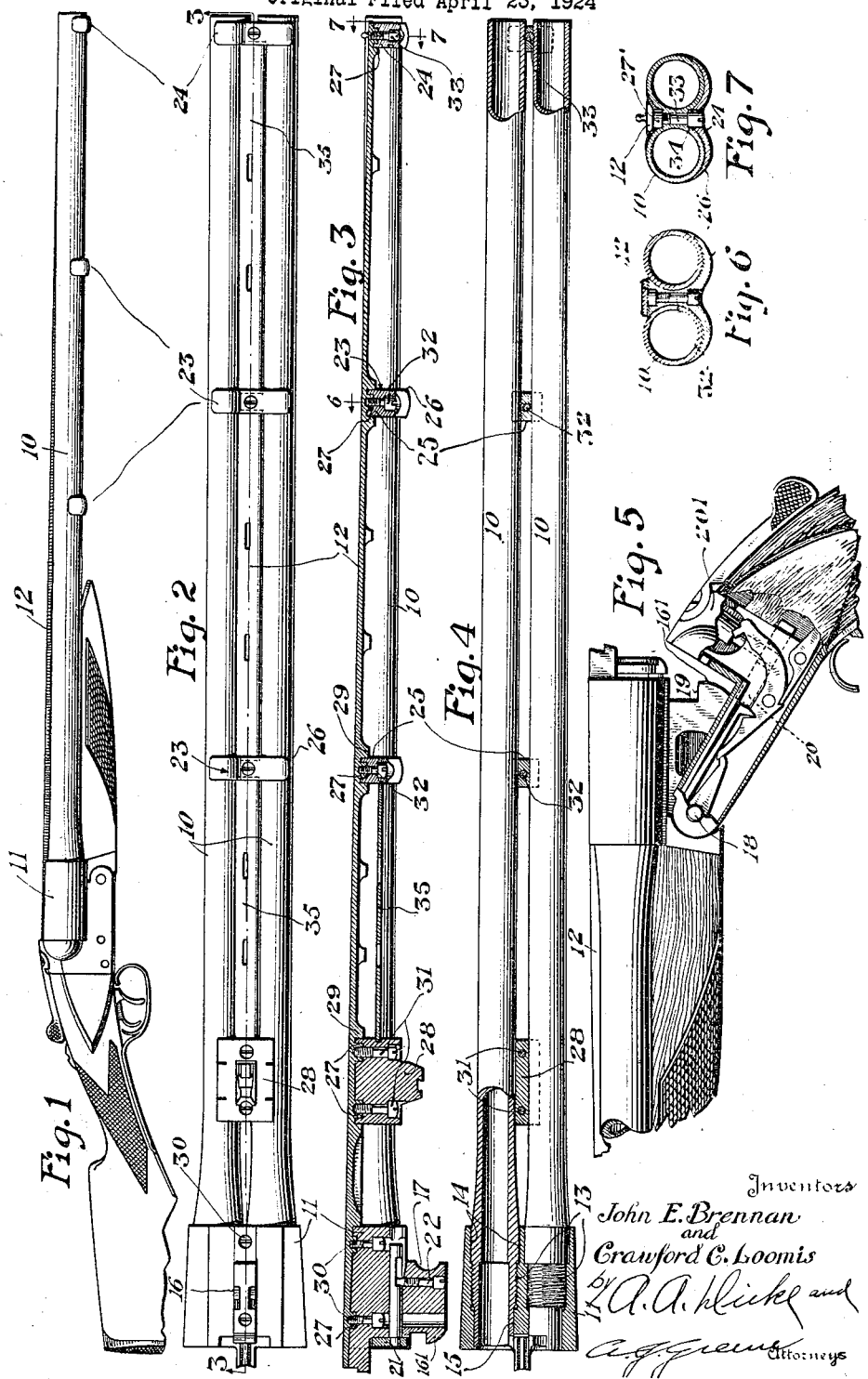

Patented Mar. 6, 1928.

1,662,025

UNITED STATES PATENT OFFICE.

JOHN E. BRENNAN AND CRAWFORD C. LOOMIS, OF ILION, NEW YORK, ASSIGNORS TO REMINGTON ARMS COMPANY, INC., A CORPORATION OF DELAWARE.

FIREARM.

Application filed April 23, 1924, Serial No. 708,414. Renewed August 3, 1927.

The usual double gun barrel assembly comprises a pair of barrels, means for securing said barrels together and a hinge and locking lug by which the barrel structure is attached to the frame.

In double guns as now manufactured for the market the hinge and locking lug may be formed as a separate piece and brazed to the two barrels, or half of the lug may be forged integral with each barrel and the two halves subsequently brazed together. The barrels, temporarily held in proper spaced relation by packing blocks, are rigidly secured together by brazing thereto a top or sighting rib. The lower part of the space between the barrels may be closed by a brazed lower rib which, with the top rib forms a closed chamber between the barrels. The barrels are subsequently straightened, both inside and out, by boring out the inside and by "striking" down the outside by grinding and filing.

A barrel assembly so fabricated is subject to many defects and disadvantages. One such defect is that the heat necessary to melt the brazing metal is injurious to the barrel metal, greatly reducing its tensile strength. On account of the enormous internal pressures to which barrels are subjected whenever a shell or cartridge is fired it is important that the full tensile strength of the metal be preserved.

Another defect arises from the difficulty of holding the barrels in correct alignment during brazing, and their distortion due to the brazing heat and subsequent cooling. Subsequent to the brazing operation the barrels are straightened, inside and out, by removing as much of the barrel metal as is necessary to make them longitudinally straight and smooth, and it not infrequently happens that so much metal is removed that parts of one or both barrels are left dangerously thin and weak. Further, if a customer demands an exceptionally light gun his wish is satisfied by removing more metal from the outside of the barrels, thereby incurring further risk that the barrels will be dangerously weakened.

A further disadvantage arises from rigidly securing the two barrels together by brazing. If one barrel is fired a number of times without firing the other barrel the resulting difference in temperature will distort the barrel structure and render the gun inaccurate. The structure may even sustain a permanent distortion after considerable use, due to the gradual relieving of internal stresses. Moreover, it is well known that at every shot a wave of elongation travels through the length of the barrel, on account of the sudden application of the large stress due to the pressure produced by combustion of the powder charge. This vibration is restrained by the brazing and strains in the barrel metal result; likewise the brazing may be loosened thereby.

Difficulty is also encountered in performing effective brazing. In order to secure such brazing a capillary attraction must exist between the brazing metal and the material to which it is applied. Barrel steels, particularly "ordnance" steel do not react toward brazing metal in a manner conducive to effective brazing.

Another defect is present when a closed bottom rib is used. A closed chamber is formed between the two barrels, and the inside of this chamber cannot be "browned" to prevent rusting. It is practically inevitable that moisture will find its way into this chamber, and rusting of the barrels result. Moreover, the moisture itself may create a dangerous pressure within the closed chamber between the barrels when suddenly heated and vaporized by rapid fire of the gun.

A further disadvantage is inherent in the method of forging longitudinal halves of the hinge and locking lug integral with the barrels. A large distortion of the barrel forging is necessary to form the lug, the operation thus involves considerable risk that the fiber of the steel will be broken at the lug, producing a weakness at a point where great strength is required. This difficulty is accentuated by the fact that the range of temperature at which barrel steels can be forged is very limited.

One object of this invention is to produce a double gun barrel structure so made and assembled that it is free from the defects hereinbefore mentioned.

A further object of the invention is to provide in a firearm a barrel structure all parts of which are secured together by mechanical means exclusively.

A further object of the invention is to provide a firearm barrel assembly, the parts of which are adapted to be permanently secured together without soldering or brazing.

A further object of the invention is to provide, in a gun barrel assembly including a plurality of barrels, novel means for securing said barrels together which permits of their independent longitudinal movement.

A further object of the invention is to provide a firearm barrel assembly comprising a breech piece and barrels, said barrels being adapted to be secured to said breech piece and to each other without soldering or brazing or any other processes including the application of heat.

A further object of the invention is to provide in a gun assembly comprising a plurality of barrels, longitudinally spaced mechanical devices adapted to engage said barrels and secure them against relative displacement.

A further object of the invention is to provide a firearm barrel assembly including longitudinally spaced mechanical devices for securing a plurality of barrels relative to each other, and an element which locks said devices against displacement.

A further object of the invention is to provide in a gun assembly comprising a plurality of barrels, novel devices holding said barrels in spaced relation and engaging the barrels at spaced intervals only.

A further object of the invention is to provide a firearm barrel assembly which can be entirely dismantled for the purpose of repair or renewal of parts with ordinary mechanical tools.

To secure these and other objects our invention comprises the novel combinations and arrangements of parts which are hereinafter fully described and are illustrated in the drawings, in which:

Fig. 1 is a longitudinal elevation of a firearm barrel assembly embodying our invention.

Fig. 2 is an inverted plan view of such a fiream.

Fig. 3 is a longitudinal section on the line 3—3 of Fig. 2.

Fig. 4 is a plan view of the barrel assembly, many parts being shown in section for greater clearness.

Fig. 5 is a fragmentary side elevation, partly in section, of a gun embodying our invention.

Fig. 6 is a section on the line 6—6 of Fig. 3.

Fig. 7 is a section on the line 7—7 of Fig. 3.

The gun barrel assembly comprises a pair of barrels or tubes 10, a breech piece or jacket 11 thru which the barrels extend, and a sighting rib 12, which rib as we shall hereinafter show also functions as a key which secures all parts in the barrel assembly in their correct relative positions. The breech jacket 11 is bored and threaded to receive the barrels in the manner clearly illustrated in Fig. 4. The threaded portion 13 of the bores in said breech piece is located between forward and rearward smooth portions thereof designated 14 and 15 respectively. The barrels thus have ample bearing surface in the breech jacket 11.

Integral with the breech jacket 11 is the hinge and locking lug 16. Said lug comprises a half journal 17 adapted to receive the hinge pin 18 about which the barrel structure pivots when the breech of the gun is opened. On closing the breech the face 161 of the lug cams rearwardly the locking piece 20, mounted in the frame 201, and when the breech is closed a locking shoulder 19 on the lug 16 engages the locking piece 20 to hold the breech of the gun closed. The breech jacket is bored and machined to receive the extractor 21 which is held against removal by the screws 22 extending vertically through the locking lug 16. It will be seen that since the barrels are mechanically attached to the breech jacket, the breech jacket with the locking lug 16 may be finished, hardened and browned before the assembly of the barrels thereto. This arrangement is of great importance since it permits a proper hardening of the lug 16, not only to withstand wear on the surfaces 17 and 161 thereof, but also a sufficient hardening throughout to withstand the shock of recoil and transmit said shock to the gun stock an indefinite number of times without deformation of said lug. Such hardening can not be secured if the breech piece is brazed to the barrels, or elements integral with the barrels and comprising the locking lug are brazed together, since the heat necessary for brazing destroys the effect of previous hardening, and conversely, the heat necessary for hardening ruins any previous brazing.

For securing the barrels 10 in proper relation and alignment a plurality of yokes 23 and 24 are provided. Each of these yokes comprises a rigid portion 25 extending upwardly between the two barrels 10, and outwardly and upwardly curving fingers 26 adapted to engage each of the barrels 10 and hold said barrels securely in contact with the rigid part 25 of said yokes. The muzzle yoke 24 differs from the intermediate yokes 23 in a manner which will be presently described.

The member 12 not only furnishes a sighting rib, but also functions as a key to lock the breech jacket, the forearm lug and the yokes against relative displacement. To this end in the embodiment of the invention herein illustrated said breech jacket comprises a plurality of bosses, preferably of cylindrical shape, adapted to be received in cylindrical recesses in the breech jacket 11, the forearm lug 28 and the yokes 23 and 24 respectively. The sighting rib also comprises a flange 29 adjacent the forward edge of the breech jacket and similar flanges adjacent opposite sides of the forearm lug and the barrel retaining yokes. To secure the sighting rib in place the bosses 27 are drilled and tapped to receive screws 30, extending upwardly through the breech jacket, screws 31 extending upwardly through the forearm lug, screws 32 extending upward through the intermediate yokes, and screws 33 extending upward through the muzzle yoke. To give the structure greater stability the muzzle yoke screw 33 is of such diameter as to project laterally from the yoke and engage the barrels directly. Said screw is also provided with a barrel engaging shoulder 34; and the boss 27' at the muzzle end of the sighting rib is of such a diameter as to engage the barrels as clearly shown in Fig. 7. The barrels are properly notched and grooved to receive shoulder 24, the shank of the screw 33 and the boss 27' and the yoke 24 is bored accordingly.

The bottom of the space between the barrels may be closed by ventilated plates 35 inserted between the yokes 27 and between the rearward yoke 27 and forearm lug 28, and engaging in shallow notches in said yokes and lug. Said plates are preferably made of spring metal and are thus readily removable.

It will be noted that each of the elements contained in this gun barrel assembly can be finished to size and browned prior to assembly. Much more thorough and satisfactory browning of parts can thus be secured. If exceptionally light barrels are desired they are made by turning the barrel tubes down prior to assembly, thus removing metal uniformly from the entire barrel, leaving a tube with a wall of uniform thickness and avoiding the dangerous local weakening resulting from methods now in vogue. In the finished structure the barrels are free for independent longitudinal movement and the space between the barrels is ventilated both above and below. The barrel tubes are turned straight and to size, and the hinge and locking lug is hardened before assembly. Assembly does not include any operation necessitating the application of heat, and may be effected as follows:

The breech jacket 11 is first held in a suitable vise, and the barrels screwed into the jacket by engaging the barrels internally with a suitable tool inserted through the jacket. The forearm lug 28 and the yokes 23 and 24 are then in turn slid over the muzzle to their correct locations, the yokes being spread by a suitable device to permit of being so positioned. Plates 35 may be put in place as each yoke is in turn brought to correct position. The sighting rib 12 is then fitted in place, the bosses 27 engaging in the recesses provided therefor in the breech jacket, the forearm lug and the yokes, and locating these members longitudinally. The operation is then completed by inserting the rib securing screws 30, 31, 32 and 33.

The invention is not to be considered as limited to the specific embodiment herein described and illustrated in the drawings, but is to be construed as extending to all equivalent devices falling within scope of the appended claims.

We claim:

1. A gun barrel assembly comprising a breeched piece, a plurality of barrels having threaded connections with said breech piece, and means for retaining said barrels against relative displacement comprising a series of yokes having a rigid center part which extends between said barrels and spring fingers partially encircling said barrels.

2. In a gun barrel assembly, a plurality of barrels, means for securing said barrels against relative displacement, comprising longitudinally spaced yokes each having a rigid center part extending between said barrels and spring fingers partially encircling said barrels.

3. In a gun barrel assembly, means for preventing relative displacement of a plurality of barrels, comprising a plurality of yokes spaced longitudinally of said barrels, each of said yokes comprising a rigid part extending between said barrels and spring fingers partially encircling said barrels, a sighting rib, and interengaging means, whereby said sighting rib and said yokes mutually retain each other against displacement.

4. A gun barrel assembly comprising a plurality of barrels, means for retaining said barrels against relative displacement, comprising a plurality of longitudinally spaced yokes, each of said yokes comprising a rigid part extending between said barrels and spring fingers partially encircling said barrels, a sighting rib, interengaging means whereby said sighting rib and said yokes mutually retain each other against relative longitudinal displacement, and means for retaining said sighting rib and said yokes against relative vertical displacement.

5. In a gun barrel assembly, means for securing a pair of barrels against relative displacement comprising a yoke, said yoke comprising a rigid part extending between said barrels, and spring flanges extending outwardly beneath said barrels, whereby said barrels are pressed into close contact with rigid part of said yoke.

6. In a gun barrel assembly, means for preventing relative displacement of a plurality of barrels comprising a plurality of yokes spaced longitudinally of said barrels, one of said yokes comprising openings in its barrel engaging surfaces, a sighting element, means associated with said sighting element adapted to secure said yokes against longitudinal displacement, said means including a member projecting thru certain of said openings, and recesses in said barrel adapted to receive said projecting means.

7. In a shotgun barrel assembly, means for securing a plurality of barrels against relative displacement comprising a yoke, extending between said barrels, openings in the barrel-engaging surfaces of said yoke, elements extending thru said openings, and means on said barrels engaged by said elements.

8. In a shotgun barrel assembly, means for securing a plurality of barrels against relative displacement comprising a plurality of yokes spaced longitudinally of said barrels, each of said yokes comprising barrel engaging surfaces, and certain of said yokes comprising openings in said barrel engaging surfaces, and barrel engaging elements extending thru said openings.

9. A gun barrel assembly comprising a plurality of barrels, means for retaining said barrels against relative displacement comprising a plurality of yokes having barrel engaging surfaces, certain of said yokes having openings thru said barrel engaging surfaces, means for retaining said yokes against longitudinal displacement, said means comprising barrel engaging elements extending thru the openings in said yokes.

10. In a gun barrel assembly comprising a plurality of barrels and a sighting rib, means for securing said barrels and sighting rib relative to each other comprising a plurality of longitudinally spaced members provided with recesses, said sighting rib being provided with bosses adapted to enter the recesses in said members and with lugs adapted to engage said members exteriorly.

11. In a gun barrel assembly comprising a plurality of barrels, a breech piece and a plurality of spaced members securing said barrels against relative displacement; a sighting element comprising bosses adapted to engage recesses in said members and said breech piece and screws extending thru said members and said breech piece and received in said bosses.

JOHN E. BRENNAN.
CRAWFORD C. LOOMIS.